United States Patent [19]

Okada et al.

[11] Patent Number: 4,639,089
[45] Date of Patent: Jan. 27, 1987

[54] LIQUID CRYSTAL DEVICE

[75] Inventors: Shinjiro Okada, Kawasaki; Kazuharu Katagiri; Junichiro Kanbe, both of Yokohama, all of Japan

[73] Assignee: Canon Kabushiki Kaisha, Tokyo, Japan

[21] Appl. No.: 690,896

[22] Filed: Jan. 14, 1985

[30] Foreign Application Priority Data

Jan. 23, 1984 [JP] Japan ................. 59-10502

[51] Int. Cl.⁴ ......................... G02F 1/13; G02F 1/135
[52] U.S. Cl. ................... 350/341; 350/350 S
[58] Field of Search ............. 350/350 S, 330, 331 T, 350/332, 334, 341, 346

[56] References Cited

U.S. PATENT DOCUMENTS

| 3,703,331 | 11/1972 | Goldmacher et al. | 350/346 X |
| 4,097,127 | 6/1978 | Haas et al. | 350/346 X |
| 4,257,911 | 3/1981 | Gray et al. | 350/350 S X |
| 4,494,824 | 1/1985 | Nakamura et al. | 350/334 |
| 4,547,309 | 10/1985 | Mochizuki et al. | 350/346 X |
| 4,561,726 | 12/1985 | Goodby et al. | 350/341 |

Primary Examiner—Donald A. Griffin
Attorney, Agent, or Firm—Fitzpatrick, Cella, Harper & Scinto

[57] ABSTRACT

A liquid crystal showing a cholesteric phase at a higher temperature than the temperature giving a smectic phase is interposed between a pair of base plates to give a liquid crystal device. At least one of the base plates has a face to which an orientation controlling function is imparted for preferentially orienting the liquid crystal molecules in contact with the face in one direction.

33 Claims, 15 Drawing Figures

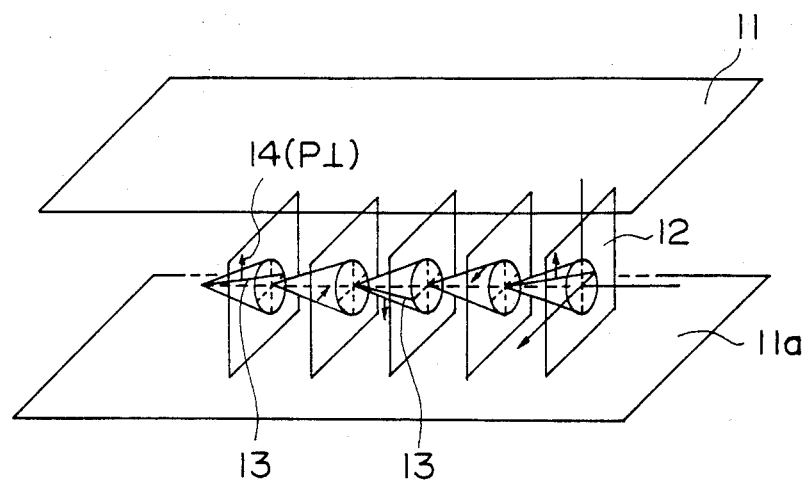
F I G. 1
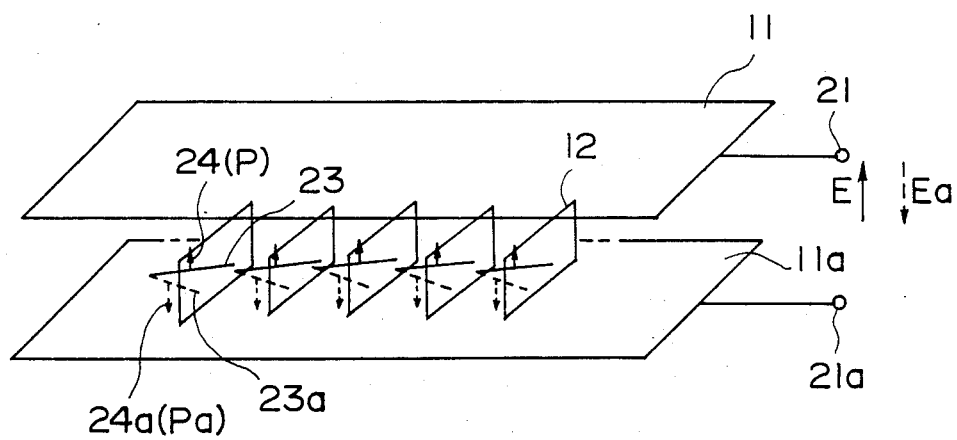
F I G. 2

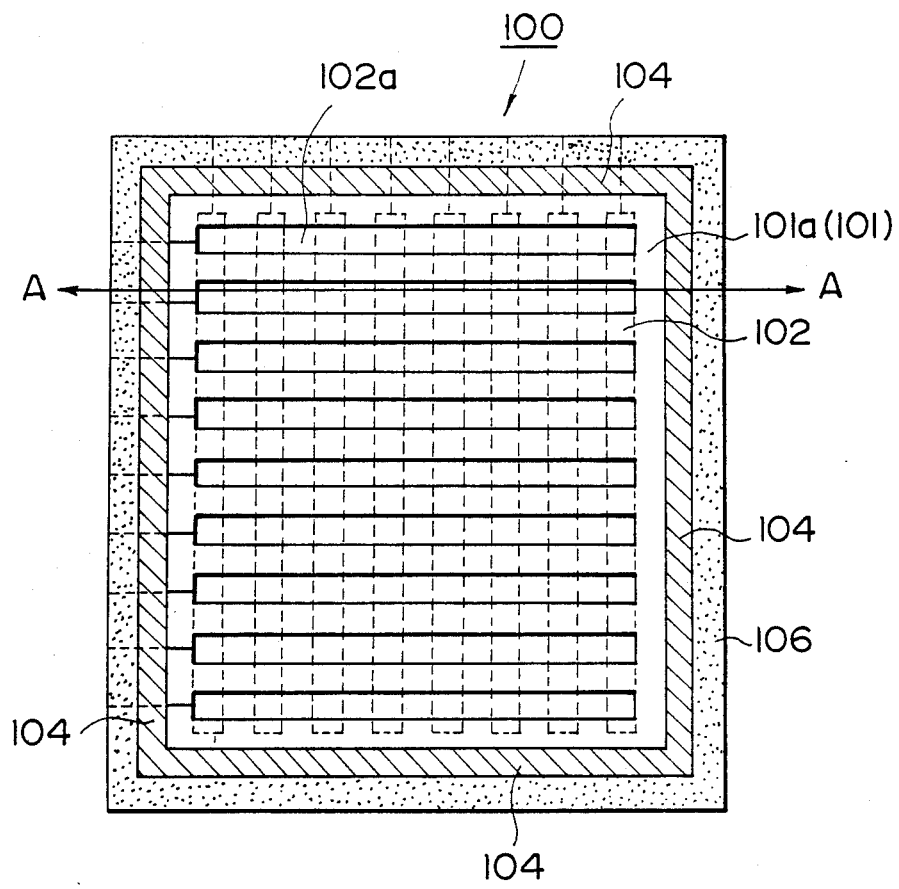
F I G. 3A

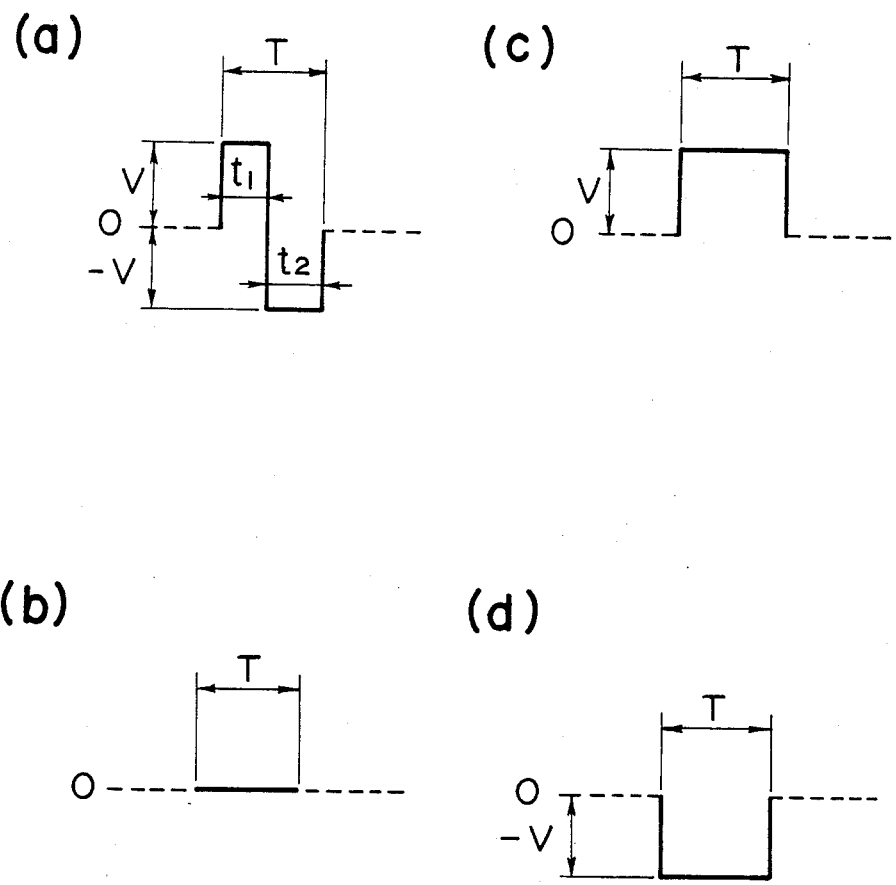
F I G. 7

LIQUID CRYSTAL DEVICE

BACKGROUND OF THE INVENTION

The present invention relates to a liquid crystal device for use in a liquid crystal display device, an optical shutter array, etc., and more particularly to a liquid crystal device having improved display and driving characteristics, because of improved initial alignment or orientation of molecules of a smectic liquid crystal, especially a ferroelectric liquid crystal.

Hitherto, liquid crystal display devices are well known, which comprise a group of scanning electrodes and a group of signal electrodes arranged in a matrix manner, and a liquid crystal compound is filled between the electrode groups to form a plurality of picture elements thereby to display images or information. These display devices employ a time-sharing driving method which comprises the steps of selectively applying address signals sequentially and cyclically to the group of scanning electrodes, and parallely effecting selective application of predetermined information signals to the group of signal electrodes in synchronism with address signals. However, these display devices and the driving method therefor have a serious drawback as will be described below.

Namely, the drawback is that it is difficult to obtain a high density of picture elements or a large image area. Because of relatively high response speed and low power dissipation, among prior art liquid crystals, most of the liquid crystals which have been put into practice as display devices are TN (twisted nematic) type liquid crystals, as shown in "Voltage-Dependent Optical Activity of a Twisted Nematic Liquid Crystal" by M. Schadt and W. Helfrich, Applied Physics Letters, Vol 18, No. 4 (Feb. 15, 1971) pp. 127-128. In the liquid crystals of this type, molecules of nematic liquid crystal which show positive dielectric anisotropy under no application of an electric field form a structure twisted in the thickness direction of liquid crystal layers (helical structure), and molecules of these liquid crystals are aligned or oriented parallel to each other in the surfaces of both electrodes. On the other hand, nematic liquid crystals which show positive dielectric anisotropy under application of an electric field are oriented or aligned in the direction of the electric field. Thus, they can cause optical modulation. When display devices of a matrix electrode array are designed using liquid crystals of this type, a voltage higher than a threshold level required for aligning liquid crystal molecules in the direction perpendicular to electrode surfaces is applied to areas (selected points) where scanning electrodes and signal electrodes are selected at a time, whereas a voltage is not applied to areas (non-selected points) where scanning electrodes and signal electrodes are not selected and, accordingly, the liquid crystal molecules are stably aligned parallel to the electrode surfaces. When linear polarizers arranged in a crossnicol relationship, i.e., with their polarizing axes being substantially perpendicular to each other, are arranged on the upper and lower sides of a liquid crystal cell thus formed, a light does not transmit at selected points while it transmits at non-selected points. Thus, the liquid crystal cell can function as an image device.

However, when a matrix electrode structure is constituted, a certain electric field is applied to regions where scanning electrodes are selected and signal electrodes are not selected or regions where scanning electrodes are not selected and signal electrodes are selected (which regions are so called "half-selected points"). If the difference between a voltage applied to the selected points and a voltage applied to the half-selected points is sufficiently large, and a voltage threshold level required for allowing liquid crystal molecules to be aligned or oriented perpendicular to an electric field is set to a value therebetween, the display device normally operates. However, in fact, as the number (N) of scanning lines increases, a time (duty ratio) during which an effective electric field is applied to one selected point when a whole image area (corresponding to one frame) is scanned decreases with a ratio of 1/N. For this reason, the larger the number of scanning lines, the smaller is the voltage difference as an effective value applied to a selected point and nonselected points when scanning is repeatedly effected. As a result, this leads to unavoidable drawbacks of lowering of image contrast or occurrence of crosstalk. These phenomena result in problems that cannot be essentially avoided, which appear when a liquid crystal not having bistability (which shows a stable state where liquid crystal molecules are oriented or aligned in a horizontal direction with respect to electrode surfaces, but are oriented in a vertical direction only when an electric field is effectively applied) is driven, i.e., repeatedly scanned, by making use of time storage effect. To overcome these drawbacks, the voltage averaging method, the two-frequency driving method, the multiple matrix method, etc., have already been proposed. However, these methods are not sufficient to overcome the above-mentioned drawbacks. As a result, it is the present state that the development of large image area or high packaging density in respect to display elements is delayed because of the fact that it is difficult to sufficiently increase the number of scanning lines.

Meanwhile, turning to the field of a printer, as means for obtaining a hard copy in response to input electric signals, a Laser Beam Printer (LBP) providing electric image signals to an electrophotographic charging member in the form of lights is the most excellent in view of density of a picture element and a printing speed.

However, the LBP has drawbacks as follows:

(1) It becomes large in apparatus size.

(2) It has high speed mechanically movable parts such as a polygon scanner, resulting in noise and requirement for strict mechanical precision, etc.

In order to eliminate drawbacks stated above, a liquid crystal shutter-array is proposed as a device for changing electric signals to optical signals. When picture element signals are provided with a liquid crystal shutter-array, however, more than 3000 signal generators are required, for instance, for writing picture element signals into a length of 210 mm in a ratio of 16 dots/mm. Accordingly, in order to independently feed signals to respective signal generators, lead lines for feeding electric signals are required to be provided to all the respective signal generators, and the production has become difficult.

In view of this, another attempt is made to apply one line of image signals in a time-sharing manner with signal generators divided into a plurality of lines.

With this attempt, signal feeding electrodes can be common to the plurality of signal generators, thereby enabling a remarkable decrease in the number of lead wires. However, if the number (N) of lines is increased while using a liquid crystal showing no bistability as usually practiced, a signal "ON" time is substantially reduced to 1/N. This results in difficulties that light quantity obtained on a photoconductive member is decreased, and a crosstalk occurs.

In order to obviate the above-mentioned drawbacks of the conventional types of liquid crystal devices, Clark and Lagerwall have proposed the use of a liquid crystal device using a bistable liquid crystal (Japanese Laid-Open Patent Application No. 107216/1981, U.S. Pat. No. 4367924, etc.). As the bistable liquid crystal, a ferroelectric liquid crystal having a chiral smectic C (SmC*) phase or H (SmH*) phase is generally used. The ferroelectric liquid crystal has bistability, i.e., has two stable states comprising a first stable state and a second stable state. Accordingly, different from the conventional TN-type liquid crystal in the above-mentioned device, the liquid crystal is oriented to the first stable state in response to one electric field vector and to the second stable state in response to the other electric field vector. Further this type of liquid crystal very quickly assumes either one of the above-mentioned two stable states in reply to an electric field applied thereto and retains the state in the absence of an electric field. By utilizing these properties, essential improvements can be attained with respect to the above-mentioned difficulties involved in the conventional TN-type liquid crystal device. This point will be explained in further detail in connection with the present invention.

However, in order that an optical modulation device using the liquid crystal having bistability could show desired operation performances, the liquid crystal interposed between a pair of parallel base plates is required to be placed in such a state of molecular arrangement that the transition between the two stable states can effectively occur, as a matter different from or a precondition of the application of an electric field. With respect to, for example, a ferroelectric liquid crystal having an SmC* or SmH* phase, there must be formed a monodomain wherein the layers of the liquid crystal are perpendicular to the face of the base plate and therefore the molecular axis of the liquid crystal is almost in parallel with the base plate face. However, in the optical modulation devices using a bistable liquid crystal, an orientation state of a liquid crystal having such a monodomain structure cannot satisfactorily be formed, whereby the optical modulation device cannot actually show sufficient performances.

For example, several methods have been proposed to give such an orientation state, including a method of applying a magnetic field and a method of applying a shearing force. These methods have not necessarily provided satisfactory results. For example, the method of applying a magnetic field requires a large size apparatus and is not readily compatible with a thin layer cell which is generally excellent in operation performances. On the other hand, the method of applying a shearing force is not compatible with a method where a cell structure is first formed and then a liquid crystal is poured thereinto.

SUMMARY OF THE INVENTION

A principal object of the present invention is, in view of the above mentioned circumstances, to provide an improvement in monodomain formability or initial alignment, of which an improvement has been desired, to an optical modulation device using a bistable liquid crystal, which is potentially suited for a display device with a high response speed, picture elements arranged at a high density and a large display area or an optical shutter having a high shutter speed, thereby to allow the optical modulation device to fully exhibit their excellent characteristics.

We have made a further study with the above object, noting the orientation characteristics of a liquid crystal during a temperature decreasing stage for causing transition from the cholesteric phase to a lower temperature phase such a smectic phase, e.g., SmA (smectic A phase). As the result, we have observed that a monodomain where liquid crystals of, e.g., smectic A phase are aligned in one direction can be formed by causing phase transition from a high temperature cholesteric phase to a smectic phase if the phase transition is effected in the presence of a face of a base plate contacting the liquid crystal, to which a function of orienting molecular axes of the liquid crystal preferentially in one direction has been imparted, whereby a liquid crystal device having operation characteristics based on the bistability of the liquid crystal and a monodomain formation characteristic of the liquid crystal layer in combination is provided.

The liquid crystal device according to the present invention is based on the above finding and, more particularly, comprises a pair of base plates and a liquid crystal interposed between the pair of base plates, the liquid crystal showing a smectic phase and a cholesteric phase at a higher temperature than that giving the smectic phase and capable of causing phase transition from the cholesteric phase to the smectic phase on temperature decrease, a face of at least one of the pair of base plates has been provided with a function of preferentially orienting the axes of the liquid crystal molecules contacting the face in one direction.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 1 and 2 are schematic perspective views illustrating the basic operation principle of a liquid crystal cell used in the present invention, FIG. 3A is a plan view showing an example of the liquid crystal device according to the present invention, FIGS. 7(a) to 7(d) illustrate signals for driving a liquid crystal device used in the present invention.

DESCRIPTION OF THE PREFERRED EMBODIMENTS

Figure 3B:
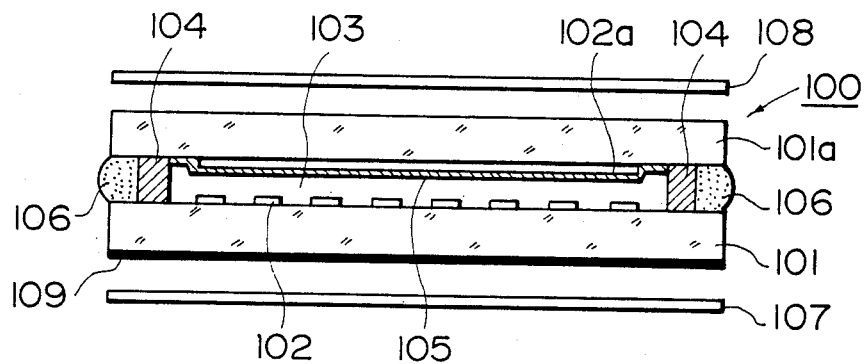
FIG. 3B is a sectional view taken along the line A—A in FIG. 3A.

Liquid crystal material most suited for the present invention are chiral smectic liquid crystals showing ferroelectricity. More specifically, liquid crystals showing chiral smectic C phase (SmC*), H phase (SmH*), I phase (SmI*), J phase (SmJ*), K phase (SmK*), G phase (SmG*), or F phase (SmF*) are available. Especially, the chiral smectic liquid crystal used in the liquid crystal device according to the present invention is required to show a cholesteric phase at a temperature higher than the temperature for giving a smectic phase. Specific examples of the chiral smectic liquid crystal are listed below:

| Liquid Crystal No. | |
|---|---|
| 1. | 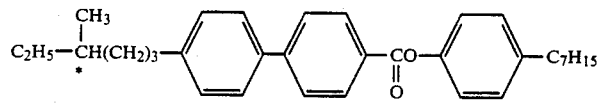<br>4-heptylphenyl-4-(4''-methylhexyl)biphenyl-4'-carboxylate<br>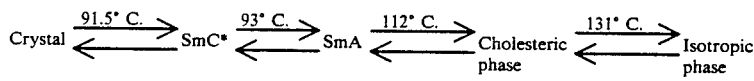 |
| 2. | 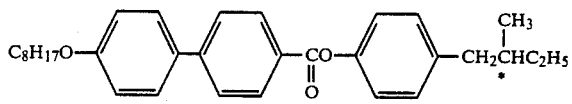<br>4-(2'-methylbutyl)phenyl-4'-octyloxybiphenyl-4-carboxylate<br>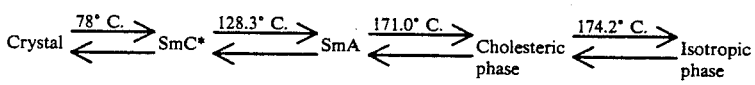 |
| 3. | 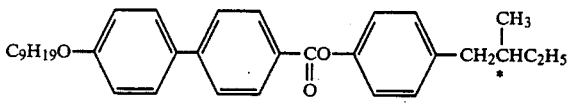<br>4-(2'-methylbutyl)phenyl-4'-nonyloxybiphenyl-4-carboxylate<br>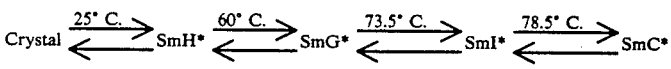<br>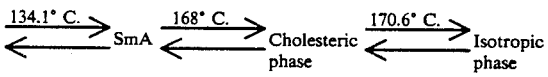 |
| 4. | 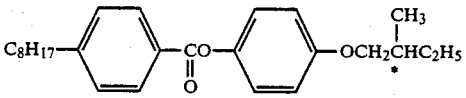<br>p-(2-methylbutyloxy)phenyl-p'-n-octyloxybenzoate<br>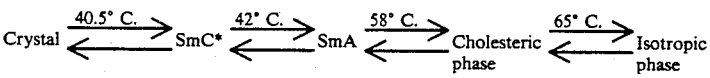 |
| 5. | 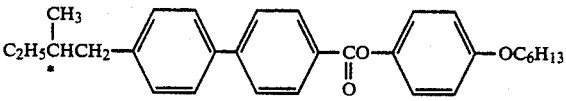<br>4-hexyloxyphenyl-4-(2''-methylbutyl)biphenyl-4'-carboxylate<br>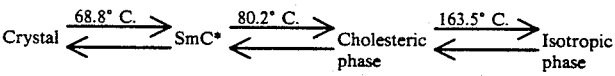 |
| 6. | 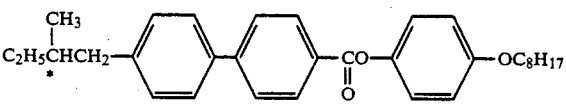<br>4-octyloxyphenyl-4-(2''-methylbutyl)biphenyl-4'-carboxylate |

| Liquid Crystal No. | |
| --- | --- |

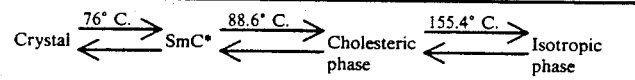

7. 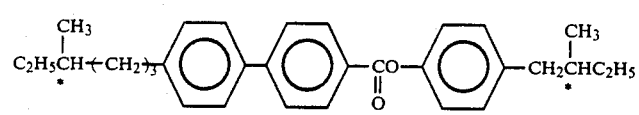

4-(2"-methylbutylphenyl)-4-(4'''-methylhexyl)biphenyl-4'-carboxylate

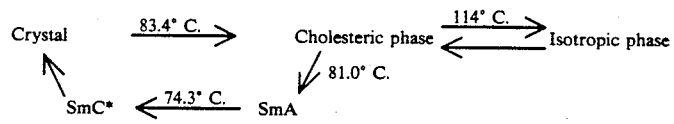

When a device is constituted using these materials, the device may be supported with a block of copper, etc., in which a heater is embedded in order to realize a temperature condition where the liquid crystal compounds assume a smectic phase.

Referring to FIG. 1, there is schematically shown an example of a ferroelectric liquid crystal cell for explanation of the operation thereof. Reference numerals 11 and 11a denote base plates (glass plates) on which a transparent electrode of, e.g., $In_2O_3$, $SnO_2$, ITO (Indium-Tin Oxide), etc., is disposed, respectively. A liquid crystal of an SmC*- or SmH*-phase in which liquid crystal molecular layers 12 are oriented perpendicular to surfaces of the glass plates is hermetically disposed therebetween. A full line 13 shows liquid crystal molecules. Each liquid crystal molecule 13 has a dipole moment (P⊥) 14 in a direction perpendicular to the axis thereof. When a voltage higher than a certain threshold level is applied between electrodes formed on the base plates 11 and 11a, a helical structure of the liquid crystal molecule 13 is loosened or unwound to change the alignment direction of respective liquid crystal molecules 13 so that the dipole moments (P⊥) 14 are all directed in the direction of the electric field. The liquid crystal molecules 13 have an elongated shape and show refractive anisotropy between the long axis and the short axis thereof. Accordingly, it is easily understood that when, for instance, polarizers arranged in a cross nicol relationship, i.e., with their polarizing directions crossing each other, are disposed on the upper and the lower surfaces of the glass plates, the liquid crystal cell thus arranged functions as a liquid crystal optical modulation device of which optical characteristics vary depending upon the polarity of an applied voltage.

The liquid crystal layer in the liquid crystal device of the present invention may be rendered sufficiently thin in thickness (e.g., less than 10 μ). As the thickness of the liquid crystal layer is decreased, the helical structure of the liquid crystal molecules is loosened even in the absence of an electric field whereby the dipole moment assumes either of the two states, i.e., P in an upper direction 24 or Pa in a lower direction 24a as shown in FIG. 2. When electric field E or Ea higher than a certain threshold level and different from each other in polarity as shown in FIG. 2 is applied to a cell having the above-mentioned characteristics, the dipole moment is directed either in the upper direction 24 or in the lower direction 24a depending on the vector of the electric field E or Ea. In correspondence with this, the liquid crystal molecules are oriented in either of a first stable state 23 or a second stable state 23a.

When the above-mentioned ferroelectric liquid crystal is used as an optical modulation element, it is possible to obtain two advantages as briefly touched on hereinbefore. First is that the response speed is quite fast. Second is that the orientation of the liquid crystal shows bistability. The second advantage will be further explained, e.g., with reference to FIG. 2. When the electric field E is applied to the liquid crystal molecules, they are oriented in the first stable state 23. This state is kept stable even if the electric field is removed. On the other hand, when the electric field Ea of which direction is opposite to that of the electric field E is applied thereto, the liquid crystal molecules are oriented to the second stable state 23a, whereby the directions of the molecules are changed. This state is similarly kept stable even if the electric field is removed. Further, as long as the magnitude of the electric field E being applied is not above a certain threshold value, the liquid crystal molecules are placed in the respective orientation states. In order to effectively realize high response speed and bistability, it is preferable that the thickness of the cell is as thin as possible.

The most serious problem encountered in forming a device using such a ferroelectric liquid crystal has been, as briefly mentioned hereinbefore, that it is difficult to form a cell having a highly uniform monodomain wherein liquid crystal layers having an SmC* or SmH* phase are aligned perpendicular to the base plate phases and the liquid crystal molecules are aligned almost in parallel with the base plate phases. A principal object of the invention is to provide a solution to this problem.

FIGS. 3A and 3B illustrate an example of the liquid crystal device according to the present invention. FIG. 3A is a plan view of the example and FIG. 3B is a sectional view taken along the line A—A in FIG. 3A.

A cell structure 100 shown in FIG. 3 comprises a pair of base plates 101 and 101a made of glass plates or plastic plates which are held with a predetermined gap with spacers 104 and sealed with an adhesive 106 to form a cell structure. On the base plate 101 is further formed an electrode group (e.g., an electrode group for applying scanning voltages of a matrix electrode structure) comprising a plurality of transparent electrodes in a predetermined pattern, e.g., of a stripe pattern. On the base plate 101 is formed another electrode group (e.g., an electrode group for applying signal voltages of the matrix electrode structure) comprising a plurality of transparent electrodes 102a crossing the transparent electrodes 102.

On the base plate provided with such transparent electrodes may be further formed an orientation controlling film 105 composed of an inorganic insulating material such as silicon monoxide, silicon dioxide, aluminum oxide, zirconia, magnesium fluoride, cerium oxide, cerium fluoride, silicon nitride, silicon carbide, and boron nitride, or an organic insulating material such as polyvinyl alcohol, polyimide, polyamide-imide, polyester-imide, polyparaxylylene, polyester, polycarbonate, polyvinyl acetal, polyvinyl chloride, polyamide, polystyrene, cellulose resin, melamine resin, urea resin and acrylic resin.

The orientation controlling film 105 may be formed by first forming a film of an inorganic insulating material or an organic insulating material as described above and then rubbing the surface thereof in one direction with velvet, cloth, paper, etc.

In another preferred embodiment according to the present invention, the orientation controlling film 105 may be formed as a film of an inorganic insulating material such as SiO or $SiO_2$ on the base plate 101a by the oblique or tilt vapor deposition.

Figure 5:
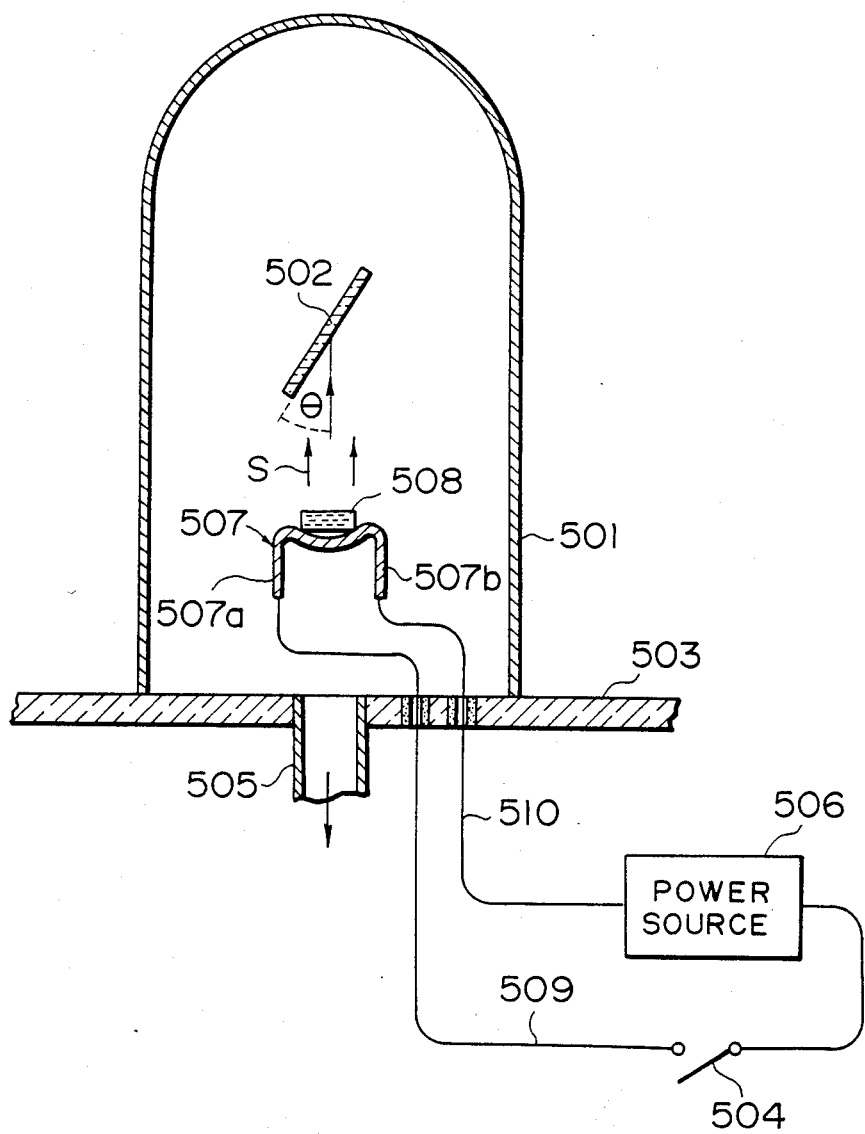
FIG. 5 is a sectional view schematically showing a tilt or oblique vapor deposition apparatus for use in production of the liquid crystal device according to the invention, FIG. 6 a schematic plan view showing an electrode arrangement of a liquid crystal device used in the present invention.

In an apparatus shown in FIG. 5, a bell jar 501 is placed on an insulating base plate 503 provided with a suction hole 505 and the bell jar 501 is made vacuum by operating a vacuum pump (not shown) connected the suction hole 505. A crucible 507 made of tungsten or molybdenum is placed inside and at the bottom of the bell jar 501. In the crucible 507 is paced several grams of a crystal such as SiO, $SiO_2$ or $MgF_2$. The crucible 507 has two downwardly extending arms 507a and 507b, which are respectively connected to lead wires 509 and 510. A power source 506 and a switch 504 are connected in series to the lead wires 509 and 510 outside the bell jar 501. A base plate 502 is disposed inside the bell jar 501 and right above the crucible 507 so that it forms an angle of $\theta$ with respect to the vertical axis of the bell jar 501.

First, the bell jar 501 is evacuated to a vacuum of about $10^{-5}$ mmHg while the switch 504 is open. Then the switch 504 is closed to supply power while adjusting an output of the power source 506 until the crucible is heated to an incandescent state of an appropriate temperature for evaporating the crystal 508. About 100 amps. of current is required for giving an appropriate temperature range (700°-1000° C.). The crystal 508 is then evaporated off to form an upward molecular stream denoted by S in the figure. The stream S is incident on the base plate 502 with an angle thereto of $\theta$ to coat the base plate 502. The angle $\theta$ is the above mentioned incident angle and the direction of the stream S is the "oblique or tilt vapor deposition direction". The thickness of the film is determined based on the calibration of the thickness with respect to the operation time which is effected prior to the introduction of the base plate 502 into the bell jar 501. After an appropriate thickness of the film is formed, a power supply from the source 506 is decreased, the switch 504 is opened, and the bell jar 501 and the interior thereof are cooled. Then, the pressure in the bell jar is raised to atmospheric pressure and the base plate 502 is taken out from the bell jar 501.

In still another embodiment, the orientation controlling film 105 may be formed by first forming a uniform film of the above-mentioned inorganic or organic insulating material on, i.e., in contact with or above, the base plate 101a and then subjecting the surface of the film to the oblique or tilt etching to provide the surface with an orientation controlling effect.

It is preferred that the orientation controlling film 105 is also caused to function as an insulating film. For this purpose, the orientation controlling film may preferably have a thickness in the range of 100 Å to 1 $\mu$, especially 500 Å to 5000 Å. The insulating film also has a function of preventing the occurrence of an electric current which is generally caused due to minor quantities of impurities contained in the liquid crystal layer 103, whereby deterioration of the liquid crystal compounds is prevented even on repeating operations.

In the liquid crystal device according to the present invention, it is possible to form an orientation controlling film similar to the orientation controlling film 105 also on the other base plate 101.

A similar orientation controlling effect can also be imparted to the side walls of spacers 104 in the structure shown in FIG. 3, for example, by rubbing.

In the cell structure shown in FIG. 3, the liquid crystal layer 103 may be formed into a chiral smectic phase such as SmC* or SmH* phase. The liquid crystal layer 103 having a chiral smectic phase is formed by first forming an SmA (smectic A) phase through phase transition from a cholesteric phase, particularly a cholesteric phase with a grandjean texture, on cooling and by further phase transition on cooling into a chiral smectic phase such as SmC* or SmH* phase.

One important aspect of the present invention is that, when the cholesteric phase with a grandjean texture is transformed into SmA phase, the helical structure of the grandjean texture is unwound to cause phase transition in the SmA phase, and the axes of the liquid crystal molecules of the SmA phase are aligned or oriented in the orientation controlling direction imparted to the orientation controlling film, whereby a uniform monodomain is formed.

Figure 4:
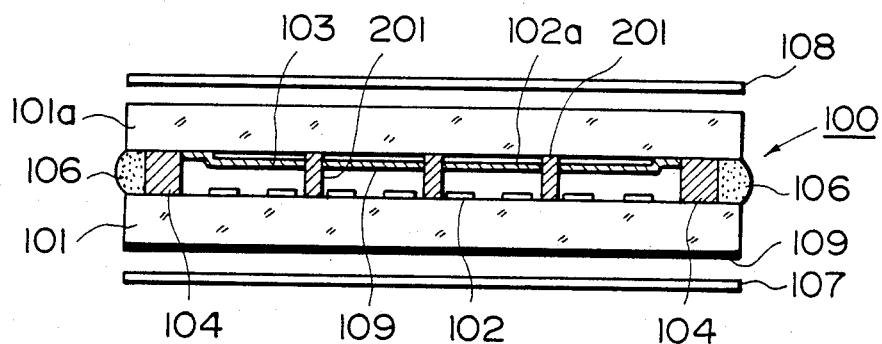
FIG. 4 is a sectional view showing another example of the liquid crystal device according to the present invention.

FIG. 4 shows another embodiment of the liquid crystal device according to the present invention. In the liquid crystal device shown in FIG. 4, a plurality of spacer members 201 are disposed between a pair of base plates 101 and 101a. The spacer members 201 can be provided by forming a film of an inorganic compound such as SiO, $SiO_2$, $Al_2O_3$ and $TiO_2$, or a resin such as polyvinyl alcohol, polyimide, polyamide-imide, polyester-imide, polyparaxylylene, polyester, polycarbonate, polyvinyl acetal, polyvinyl chloride, polyvinyl acetate, polyamide, polystyrene, cellulose resin, melamine resin, urea resin, acrylic resin and a photoresist resin, and by etching the film to leave the spacer members at appropriate parts.

A similar orientation effect as explained with reference to the surface of the base plate 101 or 101a can also be imparted to the side wall of the spacer members 104 and 201.

Such a cell structure 100 having base plates 101 and 101 a as shown in FIGS. 3 or 4 is sandwiched between a pair of polarizers 107 and 108 to form an optical modulation device causing optical modulation when a voltage is applied between electrodes 102 and 102a.

Next, the process for producing the liquid crystal device according to the present invention by orientation-controlling the liquid crystal layer 103 is explained more specifically, with reference to FIG. 3 and the above-mentioned liquid crystal No. 1 as an example of the liquid crystal material.

First, a cell 100 containing the liquid crystal No. 1 is set in such a heating case that the whole cell 100 is uniformly heated therein. Then, the cell 100 is heated to a temperature (about 180° C.) where the liquid crystal in the cell assumes an isotropic phase. The temperature of the heating case is decreased at a rate of the order of 2°-3° C./hr, whereby the liquid crystal in the cell 100 is subjected to a temperature decreasing stage. In the temperature decreasing stage, the liquid crystal in the isotropic phase is transformed at about 174° C. into a cholesteric phase having a grandjean texture and, on further cooling, transformed from the cholesteric phase to an SmA phase at about 170° C. Herein, the axes of the liquid crystal molecules in the SmA phase are aligned in the rubbing direction.

Then, the liquid crystal in the SmA phase is transformed into an SmC* phase on further cooling, whereby a monodomain of SmC* phase with a non-spiral structure is formed if the cell thickness is of the order of, for example, 1 µm.

Figure 6:
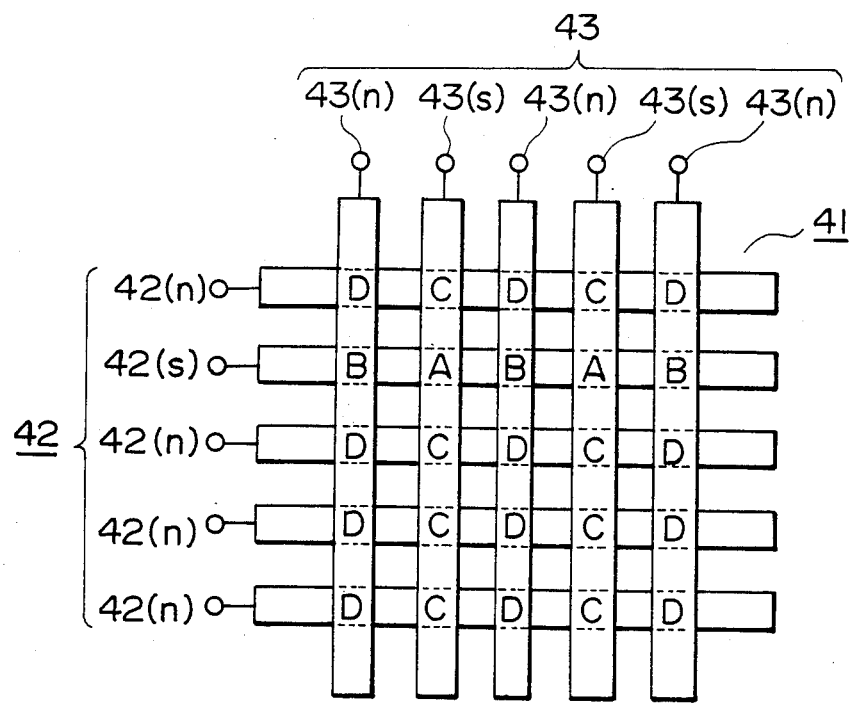
Figure 8:
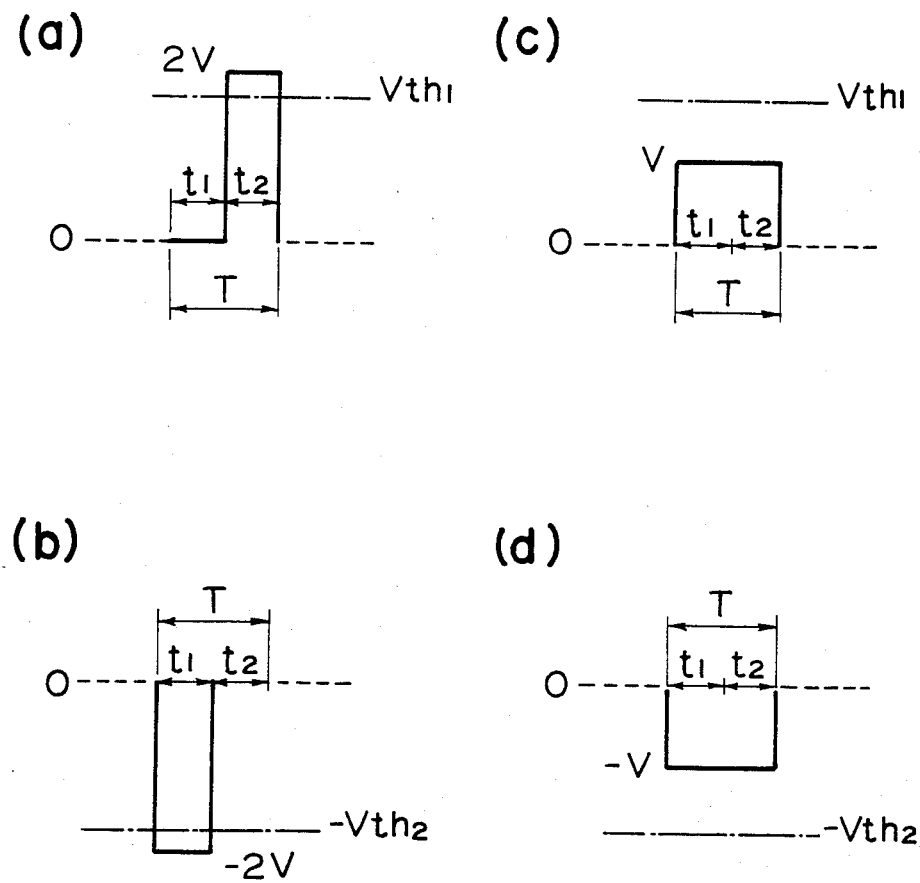
FIGS. 8(a) to 8(d) illustrate waveforms applied to respective picture elements.

Referring to FIG. 6, there is schematically shown an example of a cell 41 having a matrix electrode arrangement in which a ferroelectric liquid crystal compound is interposed between a pair of groups of electrodes oppositely spaced from each other. Reference numerals 42 and 43 respectively denote a group of scanning electrodes to which scanning signals are applied and a group of signal electrodes to which information signals are applied. Referring to FIGS. 7(a) and 7(b), there are respectively shown electric signals applied to a selected scanning electrode 42(s) and electric signals applied to the other scanning electrodes (non-selected scanning electrodes) 42(n). On the other hand, FIGS. 7(c) and 7(d) show electric signals applied to the selected signal electrode 43(s) and electric signals applied to the non-selected signal electrodes 43(n), respectively. In FIGS. 7(a) to 7(d), the abscissa and the ordinate represent a time and a voltage, respectively. For instance, when displaying a motion picture, the group of scanning electrodes 42 are sequentially and periodically selected. If a threshold voltage for giving a first stable state of the liquid crystal having bistability is referred to as $V_{th1}$ and a threshold voltage for giving a second stable state thereof as $-V_{th2}$, an electric signal applied to the selected scanning electrode 42(s) is an alternating voltage showing V at a phase (time) $t_1$ and $-V$ at a phase (time) $t_2$, as shown in FIG. 7(a). The other scanning electrodes 42(n) are grounded as shown in FIG. 7(b). Accordingly, the electric signals appearing thereon show zero volt. On the other hand, an electric signal applied to the selected signal electrode 43(s) shows V as indicated in FIG. 7(c) while an electric signal applied to the non-selected signal electrodes 43(n) shows $-V$ as indicated in FIG. 7(d). In this instance, the voltage V is set to a desired value which satisfies $V < V_{th1} < 2V$ and $-V > -V_{th2} > -2V$. Voltage waveforms applied to each picture element when such electric signals are given are shown in FIG. 8. Waveforms shown in FIGS. 8(a), 8(b), 8(c) and 8(d) correspond to picture elements A, B, C and D shown in FIG. 6, respectively. Namely, as seen from FIG. 8(a), a voltage of 2 volts above the threshold level $V_{th1}$ is applied to the picture elements A on the selected scanning line at a phase of $t_2$. Further, a voltage of $-2$ volts above the threshold level $-V_{th2}$ is applied to the picture elements B on the same scanning line at a phase of $t_1$. Accordingly, depending upon whether a signal electrode is selected or not on a selected scanning electrode line, the orientation of liquid crystal molecules changes. Namely, when a certain signal electrode is selected, the liquid crystal molecules are oriented to the first stable state, while when not selected, oriented to the second stable state. In either case, the orientation of the liquid crystal molecules is not related to the previous states of each picture element.

On the other hand, as indicated by the picture elements C and D on the non-selected scanning lines, a voltage applied to all picture elements C and D is $+V$ or $-V$, each not exceeding the threshold level. Accordingly, the liquid crystal molecules in each of picture elements C and D are placed in the orientations corresponding to signal states produced when they have been last scanned without change in orientation. Namely, when a certain scanning electrode is selected, signals corresponding to one line are written and thus writing of signals corresponding to one frame is completed. The signal state of each picture element can be maintained until the line is subsequently selected. Accordingly, even if the number of scanning lines increases, the duty ratio does not substantially change, resulting in no possibility of lowering in contrast, occurrence of crosstalk, etc. In this instance, the magnitude of the voltage V and length of the phase $(t_1 + t_2) = T$ usually ranges from 3 volts to 70 volts and from 0.1 µ sec. to 2 msec., respectively, although they change depending upon the thickness of a liquid crystal material or a cell used. In this way, the electric signals applied to a selected scanning electrode can cause either direction of change in state, i.e., from a first stable state (defined herein as "bright" state when converted to corresponding optical signals) to a second stable state (defined as "dark" state when converted to corresponding optical signals), or vice versa.

Compared with a liquid crystal not showing a cholesteric phase on a higher temperature side than the temperature range giving a smectic phase such as DOBAMBC (decyloxybenzylidene-p'-amino-2-methylbutyl cinnamate) or HOBACPC (hexyloxybenzylidene-p'-amino-2-chloropropyl cinnamate) the liquid crystal used in the present invention showing a cholesteric phase at a temperature higher than that giving the smectic phase is advantageous in that it has a better orientation characteristic and gives an orientation or alignment state free of orientation defects.

As for the extent of orientation controlling treatment, it is preferred to impart such an orientation controlling treatment or layer to only one of the pair of base plates in order to give a faster response speed because a weaker constraining force acting on liquid crystal molecules on the surface of the base plate (or a weaker orientation controlling effect imparted to the base plate) favors a better switching characteristic (faster response speed), especially when a thin cell is used or an SmC* or SmH* phase having bistability (memory characteristic) is formed. For example, with respect to a cell having a thickness of 2 µm or less, a cell in which only one base plate has been subjected to an orientation controlling treatment gives about twice as fast a response speed as that obtained by a cell in which both base plates have been treated for orientation control.

The present invention will be further explained with reference to working examples.

EXAMPLE 1

On a square glass base plate were formed ITO (Indium-Tin-Oxide) electrode films in the form of stripes with a width of 62.5 μm at a pitch of 100 μm. In an apparatus for the oblique vapor deposition as shown in FIG. 5, the base plate was disposed with its face having the ITO film being directed downward and a crystal of SiO$_2$ was set in a crucible of molybdenum. Then the vapor deposition apparatus was evacuated to a vacuum of the order of 10$^{-5}$ mmHg and SiO$_2$ was obliquely vapor-deposited in a prescribed manner to form an electrode plate with an 800 μ-thick oblique vapor deposition film (A electrode plate).

On the other hand, on a similar glass plate provided with stripe-form ITO electrode films was applied a polyimide-forming sulution ("PIQ": polyimide-isoindloquinazoline-dione, produced by Hitachi Kasei Kogyo K.K.; Non-volatile content: 14.5 wt. %) by means of a spinner coater, which was then heated at 80° C. for 30 minutes to form a film of 800 Å in thickness (B electrode plate).

Then, a heat-setting epoxy adhesive was applied to the periphery of the A electrode plate except for the portion forming an injection port by screen printing process. The A electrode plate and the B electrode plate were superposed with each other so that their stripe-pattern electrodes crossed each other with right angles and secured to each other with a polyimide spacer while leaving the gap of 2 μ therebetween.

Through the injection port of the thus formed cell was injected the above-mentioned liquid crystal No. 1 in the isotropic phase into the cell, and the injection port was sealed. The liquid crystal cell thus formed was gradually cooled at a rate of about 3° C./hr while being sandwiched between a pair of polarizers arranged in the cross nicol relationship and, at a constant temperature of about 120° C., was observed through a microscope, whereby an SmC* phase free of orientation defects was found to be formed.

COMPARATIVE EXAMPLE 1

A liquid crystal cell was prepared in the same manner as in Example 1 except that the liquid crystal No. 1 was replaced by DOBAMBC which is a liquid crystal compound not showing a cholesteric phase at a temperature higher than that giving the smectic phase and the liquid crystal cell was maintained at 80° C.±0.5° C.

The liquid crystal cell was subjected to the microscope observation as in Example 1, whereby a large number of linear orientation defects were found to be formed especially around the ITO pattern electrodes.

EXAMPLE 2

Two B electrode plates each of which was identical to the B electrode plate used in Example 1, were provided and respectively subjected to rubbing treatment in one direction.

Then, a heat-setting epoxy adhesive was applied at the periphery of one of the two B electrode plates except for the portion forming an injection port by screen printing process. The two B electrode plates were superposed with each other so that their stripe pattern electrodes crossed each other and their rubbing directions were in parallel with each other and the two electrode plates were secured to each other with a polyimide spacer while leaving the gap of 2μ therebetween.

Through the injection port into the cell thus formed was injected the above mentioned liquid crystal No. 1, and the injection port was sealed. The liquid crystal cell thus formed was cooled while being sandwiched between a pair of polarizers arranged in the cross nicol relationship and, at a constant temperature of about 120° C., was observed through a microscope, whereby an SmC* phase free of orientation defects was found to be formed.

COMPARATIVE EXAMPLE 2

A liquid crystal cell was prepared in the same manner as in Example 2 except that the liquid crystal No. 1 was replaced by DOBAMBC and the liquid crystal cell was held at 80° C.±0.5° C.

The liquid crystal cell was subjected to the microscope observation as in Example 2, whereby a large number of linear orientation defects were found to be formed especially around the ITO pattern electrodes.

EXAMPLE 3

A liquid crystal cell was prepared in the same manner as in Example 2 except that the liquid crystal No. 1 was replaced by the above-mentioned liquid crystal No. 4 and the liquid crystal cell was held at 41° C.±0.5° C. According to the microscope observation as in Example 1, an SmC* phase free of orientation defects was found to be formed.

EXAMPLE 4

A liquid crystal cell was prepared in the same manner as in Example 2 except that the liquid crystal No. 1 was replaced by the above-mentioned liquid crystal No. 2 and the liquid crystal cell was held at 75° C.±0.5° C. According to the microscope observation as in Example 1, an SmC* phase free of orientation defects was found to be formed.

EXAMPLE 5

A liquid crystal cell was prepared in the same manner as in Example 2 except that the liquid crystal No. 1 was replaced by the above-mentioned liquid crystal No. 5 which shows a cholesteric phase at a temperature higher than that giving a smectic phase but does not show an SmA phase, and the liquid crystal cell was held at 70° C.±0.5° C. According to the microscope observation as in Example 1, an SmC* phase free of orientation defects was found to be formed.

COMPARATIVE EXAMPLE 3

A liquid crystal cell was prepared in the same manner as in Example 2 except that the liquid crytsal No. 1 was replaced by HOBACPC which does not show a cholesteric phase above the temperature giving a smectic phase, and the liquid crystal cell was held at 75° C.±0.5° C.

When this liquid crystal cell was subjected to the microscope observation as in Example 1, a large number of linear orientation defects were found to be formed especially around the ITO pattern electrodes.

What is claimed is:

1. A liquid crystal device comprising a pair of base plates and a liquid crystal interposed between the pair of base plates; said liquid crystal showing a smectic phase and a cholesteric phase at a higher temperature than that giving the smectic phase and being capable of causing successive phase transition from the cholesteric phase through a smectic A phase to a chiral smectic phase having a non-spiral structure on temperature decrease; a face of at least one of said pair of base plates having been provided with a function of preferentially orienting the axes of the liquid crystal molecules contacting the face in one direction.

2. The liquid crystal device according to claim 1, wherein said chiral smectic phase is a chiral smectic C phase, H phase, I phase, J phase, K phase, G phase or F phase.

3. The liquid crystal device according to claim 1, wherein said chiral smectic phase is a chiral smectic C phase.

4. The liquid crystal device according to claim 1, wherein the function of preferentially orienting the axes of the liquid crystal molecules in one direction has been provided by rubbing the face of a base plate.

5. The liquid crystal device according to claim 4, wherein said face of a base plate is formed by a film of an organic insulating material or an inorganic insulating material.

6. The liquid crystal device according to claim 5, wherein said organic insulating material is at least one resin selected from the group consisting of polyvinyl alcohol, polyimide, polyamide-imide, polyester-imide, polyparaxylylene, polyester, polycarbonate, polyvinyl acetal, polyvinyl chloride, polyvinyl acetate, polyamide, polystyrene, cellulose resin, melamine resin, urea resin, acrylic resin and a photoresist resin.

7. The liquid crystal device according to claim 5, wherein said inorganic insulating material is SiO, $SiO_2$ or $TiO_2$.

8. A liquid crystal device according to claim 1, wherein the liquid crystal in said chiral smectic phase having a non-spiral structure is oriented to a first stable state in response to one polarity of electric field and to a second stable state in response to the other polarity of electric field.

9. A liquid crystal device according to claim 8, wherein the liquid crystal in said chiral smectic phase having a non-spiral structure provides a bright state based on the first stable state when supplied with one polarity of electric field and provides a dark state based on the second stable state when supplied with the other polarity of electric field, the resultant bright and dark states being retained even after removal of the electric fields.

10. A liquid crystal device comprising a pair of base plates and a liquid crystal interposed between the pair of base plates; said liquid crystal showing a smectic phase and a cholesteric phase at a higher temperature than that giving the smectic phase and being capable of causing phase transition from the cholesteric phase to the smectic phase on temperature decrease; a face of only one of the base plates having been provided with a function of preferentially orienting the axes of the liquid crystal molecules contacting the face in one direction.

11. The liquid crystal device according to claim 10, wherein said the other base plate is provided with a spacer member which has been provided by first forming a film of an insulating material and then etching the film except a selected portion thereof.

12. The liquid crystal device according to claim 11, wherein said spacer member is a member in the form of a stripe.

13. The liquid crystal device according to claim 12, wherein said spacer member is provided in plurality.

14. A liquid crystal device according to claim 10, wherein the function of preferentially orienting the axes of the liquid crystal molecules in one direction has been provided by rubbing the face of the base plate.

15. A liquid crystal device according to claim 14, wherein said face of the base plate is formed by a film of an organic insulating material or an inorganic insulating material.

16. A liquid crystal device according to claim 15, wherein said organic insulating material is at least one resin selected from the group consisting of polyvinyl alcohol, polyimide, polyamide-imide, polyester-imide, polyparaxylylene, polyester, polycarbonate, polyvinyl acetal, polyvinyl chloride, polyvinyl acetate, polyamide, polystyrene, cellulose resin, melamine resin, urea resin, acrylic resin and a photoresist resin.

17. A liquid crystal device according to claim 10, wherein said face of the base plate is formed by a film of an inorganic insulating material selected from the group consisting of $SiO_2$ and $TiO_2$.

18. A liquid crystal device according to claim 10, wherein the liquid crystal showing a smectic phase is capable of causing a successive phase transition from the cholesteric phase through a smectic A phase to a chiral smectic phase having a non-spiral structure on temperature decrease.

19. A liquid crystal device comprising a pair of base plates and a liquid crystal interposed between the pair of base plates; said liquid crystal showing a smectic phase and a cholesteric phase at a higher temperature than that giving the smectic phase and being capable of causing phase transition from the cholesteric phase to the smectic phase on temperature decrease; a face of at least one of the pair of base plates having a film formed thereon by the oblique vapor deposition of an inorganic insulating material to thereby provide the face with a function of preferentially orienting the axes of the liquid crystal molecules contacting the face in one direction.

20. The liquid crystal device according to claim 19, wherein said inorganic insulating material is SiO or $SiO_2$.

21. A liquid crystal device comprising a pair of base plates and a liquid crystal interposed between the pair of base plates; said liquid crystal showing a smectic phase and a cholesteric phase at a higher temperature than that giving the smectic phase and being capable of causing phase transition from the cholesteric phase to the smectic phase on temperature decrease; a face of at least one of the pair of base plates having been obliquely etched to thereby provide the face with a function of preferentially orienting the axes of the liquid crystal molecules contacting the face in one direction.

22. The liquid crystal device according to claim 21, wherein said face of a base plate is given by a film of an organic or inorganic insulating material formed on the base plate or the base plate per se.

23. The liquid crystal device according to claim 22, wherein said organic insulating material is at least one resin selected from the group consisting of polyvinyl alcohol, polyimide, polyamide-imide, polyester-imide, polyparaxylylene, polyester, polycarbonate, polyvinyl acetal, polyvinyl chloride, polyvinyl acetate, polyamide, polystyrene, cellulose resin, melamine resin, urea resin, acrylic resin and a photoresist resin.

24. The liquid crystal device according to claim 22, wherein said inorganic insulating material is glass, SiO, $SiO_2$ or $TiO_2$.

25. A liquid crystal apparatus comprising:
(a) a liquid crystal device comprising matrix electrodes which in turn comprise scanning electrodes and signal electrodes forming picture elements at respective intersections thereof, having a ferroelectric liquid crystal in a chiral smectic phase interposed between the scanning electrodes and the signal electrodes, said ferroelectric liquid crystal providing a smectic A phase and a cholesteric phase at a higher temperature than that giving the chiral smectic phase, and being capable of causing a successive phase transition of the cholesteric phase, the smectic A phase and the chiral smectic phase on temperature decrease; the molecular axes of the liquid crystal being aligned in one direction when it is in the smectic A phase in the course of temperature decrease;

(b) a driving unit for successively applying a scanning signal to the scanning electrodes and for applying to said signal electrodes, in synchronism with the scanning signal, a first signal for orienting the liquid crystal in the chiral smectic phase to the first stable state to provide picture elements in a bright state, or a second signal for orienting the liquid crystal in the chiral smectic phase to the second stable state to provide picture elements in a dark state; said first signal comprising a first pulse for orienting the liquid crystal in the chiral smectic phase to the first stable state, and said second signal comprising a second pulse for orienting the liquid crystal in the chiral smectic phase to the second stable state, said second pulse having a polarity opposite to that of the first pulse; and (c) a pair of polarizers arranged in cross nicols.

26. The liquid crystal apparatus according to claim 25, wherein said liquid crystal device comprises a film of an organic material contacting the ferroelectric liquid crystal, said organic material being at least one member selected from the group consisting of polyvinyl alcohol, polyimide, polyamide-imide, polyester-imide, polyparaxylylene, polyester, polycarbonate, polyvinyl acetal, polyvinyl chloride, polyvinyl acetate, polyamide, polystyrene, cellulose resin, melamine resin, urea resin, acrylic resin and a photoresist resin.

27. The liquid crystal apparatus according to claim 25, wherein said liquid crystal device comprises a film of polyvinyl alcohol contacting the ferroelectric liquid crystal.

28. The liquid crystal apparatus according to claim 25, wherein said liquid crystal device comprises a film of polyamide contacting the ferroelectric liquid crystal.

29. The liquid crystal apparatus according to claim 25, wherein said liquid crystal device comprises a film of polyimide contacting the ferroelectric liquid crystal.

30. The liquid crystal apparatus according to claim 25, wherein said driving unit (b) comprises means for selectively applying the first signal and the second signal to the selected signal electrodes.

31. The liquid crystal apparatus according to claim 25, wherein said first and second signals are applied in different phases.

32. The liquid crystal apparatus according to claim 25, wherein said first and second pulses are applied in different phases.

33. The liquid crystal apparatus according to claim 25, wherein said ferroelectric liquid crystal in a chiral smectic phase is formed in a layer sufficiently thin in thickness so as to unwind the spiral structure thereof.

* * * * *

UNITED STATES PATENT AND TRADEMARK OFFICE
CERTIFICATE OF CORRECTION

PATENT NO. : 4,639,089
DATED : Jan. 27, 1987
INVENTOR(S) : OKADA, ET AL.

It is certified that error appears in the above-identified patent and that said Letters Patent is hereby corrected as shown below:

Column 1, line 54, "crossnicol" should be --cross nicol--.

Column 9, line 32, "paced" should be --placed--.

Column 10, line 59, "101 a" should be --101a--.

Signed and Sealed this

Twenty-eighth Day of April, 1987

Attest:

DONALD J. QUIGG

Attesting Officer

Commissioner of Patents and Trademarks